(12) United States Patent
Ichikawa (10) Patent No.: US 10,279,800 B2
(45) Date of Patent: May 7, 2019

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 15/810,573

(22) Filed: Nov. 13, 2017

(65) Prior Publication Data
US 2018/0154885 A1 Jun. 7, 2018

(30) Foreign Application Priority Data

Dec. 6, 2016 (JP) .................................. 2016-236611

(51) Int. Cl.
| | |
|---|---|
| *B60W 20/13* | (2016.01) |
| *B60K 6/445* | (2007.10) |
| *B60W 50/12* | (2012.01) |
| *B60W 10/06* | (2006.01) |
| *B60W 10/08* | (2006.01) |
| *B60W 20/20* | (2016.01) |

(Continued)

(52) U.S. Cl.
CPC ............... *B60W 20/13* (2016.01); *B60K 1/02* (2013.01); *B60K 6/445* (2013.01); *B60W 10/06* (2013.01); *B60W 10/08* (2013.01); *B60W 10/26* (2013.01); *B60W 20/20* (2013.01); *B60W 20/40* (2013.01); *B60W 40/09* (2013.01); *B60W 50/082* (2013.01); *B60W 50/12* (2013.01); *B60W 20/14* (2016.01); *B60W 2540/28* (2013.01); *B60W 2550/40* (2013.01); *B60W 2710/244* (2013.01); *Y02T 10/6239* (2013.01); *Y02T 10/6269* (2013.01); *Y02T 10/6286* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 9,573,478 | B2 * | 2/2017 | Jefferies | .............. B60L 11/1818 |
| 2006/0015231 | A1 * | 1/2006 | Yoshimura | ............... B60K 6/46 701/48 |

(Continued)

FOREIGN PATENT DOCUMENTS

| | | |
|---|---|---|
| JP | 2004-147460 A | 5/2004 |
| JP | 2004-245190 A | 9/2004 |

(Continued)

*Primary Examiner* — Tyler D Paige
(74) *Attorney, Agent, or Firm* — Oliff PLC (57) ABSTRACT

A hybrid vehicle includes an electronic control unit configured to switch a use mode between a first use mode in which an owner of the hybrid vehicle is a user and a second use mode in which any of persons other than the owner is the user. The hybrid vehicle includes an engine, a first MG, an electric power storage device electrically connected to the first MG, and the electronic control unit. When the use mode is the second use mode and the hybrid vehicle reaches a location near a destination, the electronic control unit executes recovery processing of recovering a SOC of the electric power storage device in a manner to bring the SOC closer to an initial value at time when the user starts using the hybrid vehicle.

6 Claims, 8 Drawing Sheets

(51) Int. Cl.
  *B60W 20/40*   (2016.01)
  *B60W 40/09*   (2012.01)
  *B60W 10/26*   (2006.01)
  *B60K 1/02*    (2006.01)
  *B60W 50/08*   (2012.01)
  *B60W 20/14*       (2016.01)

(56) References Cited

U.S. PATENT DOCUMENTS

| | | | | |
|---|---|---|---|---|
| 2011/0246246 A1* | 10/2011 | Johnson | ............... | G06Q 10/02 |
| | | | | 705/5 |
| 2011/0246252 A1* | 10/2011 | Uesugi | ................. | B60L 3/12 |
| | | | | 705/7.12 |
| 2015/0046011 A1 | 2/2015 | Imai et al. | | |
| 2016/0264124 A1 | 9/2016 | Hotta | | |
| 2017/0274792 A1* | 9/2017 | Vaughan | ............. | B60L 11/1844 |
| 2018/0154885 A1* | 6/2018 | Ichikawa | ................ | B60K 1/02 |
| 2018/0208213 A1* | 7/2018 | Ichikawa | ............ | B60W 50/085 |

FOREIGN PATENT DOCUMENTS

| | | |
|---|---|---|
| JP | 2008-201165 A | 9/2008 |
| JP | 2014-169059 A | 9/2014 |
| JP | 2016-165918 A | 9/2016 |
| WO | 2013/145104 A1 | 10/2013 |

\* cited by examiner

HYBRID VEHICLE AND CONTROL METHOD FOR HYBRID VEHICLE

INCORPORATION BY REFERENCE

The disclosure of Japanese Patent Application No. 2016-236611 filed on Dec. 6, 2016 including the specification, drawings and abstract is incorporated herein by reference in its entirety.

BACKGROUND

1. Technical Field

The present disclosure relates to a hybrid vehicle that is configured to be able to switch a use mode between an owner mode in which an owner of the vehicle is a user and a car sharing mode in which any of persons other than the owner is the user, and to a control method for a hybrid vehicle.

2. Description of Related Art

In Japanese Patent Application Publication No. 2014-169059 (JP 2014-169059 A), a hybrid vehicle that is configured to be able to switch a use mode between an owner mode and a car sharing mode is disclosed. In this hybrid vehicle, a function related to charging/discharging of an electric power storage device that stores electric power for travel is partially restricted during the car sharing mode. In this way, excess charging/discharging of the electric power storage device, which is resulted from driving by any person other than an owner, is prevented. Thus, deterioration of the electric power storage device is suppressed.

SUMMARY

In the car sharing mode, a user of the vehicle is possibly changed among the persons other than the owner. Accordingly, for example, in the case where the first user consumes electric power of the electric power storage device and the user is changed to the next user in this state during the car sharing mode, an amount of the electric power that can be consumed by the next user is smaller than that by the first user. As a result, there is a case where the electric power of the electric power storage device cannot be used evenly by the users.

The present disclosure provides a hybrid vehicle that allows a plurality of users to consume electric power of an electric power storage device evenly during a car sharing mode and a control method for a hybrid vehicle.

A first aspect of the present disclosure is a hybrid vehicle. The hybrid vehicle includes an engine, a first motor generator, an electric power storage device, and an electronic control unit. The first motor generator is configured to generate electric power by using power of the engine. The electric power storage device is electrically connected to the first motor generator. The electronic control unit is configured to control the engine and the first motor generator. The electronic control unit is configured to switch a use mode to either one of a first use mode and a second use mode. The first use mode is a mode in which an owner of the hybrid vehicle is a user of the hybrid vehicle. The second use mode is a mode in which any of persons other than the owner of the hybrid vehicle is the user. The electronic control unit is configured to execute recovery processing when the use mode is the second use mode. The recovery processing is processing of controlling the engine and the first motor generator such that a state of charge of the electric power storage device when the user finishes using the hybrid vehicle is brought closer to an initial value of the state of charge when the user starts using the hybrid vehicle.

With this configuration, when the use mode is the second use mode (a car sharing mode), the state of charge of the electric power storage device at use termination time is controlled to be brought closer to the initial value of the state of charge at use initiation time by the recovery processing. Thus, amounts of the electric power that can respectively be consumed by the users can be brought closer to the same level. As a result, in the second use mode (the car sharing mode), the electric power of the electric power storage device can be consumed evenly by the users.

In the hybrid vehicle, the recovery processing may be processing to bring the state of charge of the electric power storage device closer to the initial value of the state of charge by increasing an amount of the electric power generated by the first motor generator using the power of the engine when the hybrid vehicle reaches a range within a specified distance from a destination of the hybrid vehicle.

With this configuration, when the hybrid vehicle reaches a location near the destination, the amount of the electric power generated by the first motor generator using the power of the engine is increased, and the state of charge of the electric power storage device is brought closer to the initial value of the state of charge. In this way, even when the user is changed at the destination, the amounts of the electric power that can respectively be consumed by the user before a change and the user after the change can be brought closer to the same level.

The hybrid vehicle may further include a second motor generator connected to a drive wheel. The electronic control unit may be configured to, in addition to the recovery processing, prohibit travel using power of both of the first motor generator and the second motor generator when the use mode is the second use mode.

With this configuration, travel using both motors, for which a large amount of the electric power is consumed, is prohibited during the second use mode (the car sharing mode). The travel using both of the motors is the travel using the power of both of the first motor generator and the second motor generator. In this way, a discharged amount of the electric power by the electric power storage device during the second use mode (the car sharing mode) is suppressed. As a result, the state of charge of the electric power storage device can further easily be brought closer to the initial value thereof by the recovery processing.

The hybrid vehicle may be configured to travel in any of control modes that include a first control mode and a second control mode. The second control mode may be a control mode in which a starting condition of the engine is less likely to be established than in the first control mode. In the hybrid vehicle, the electronic control unit may be configured to prohibit the travel in the second control mode when the use mode is the second use mode.

With this configuration, during the second use mode (the car sharing mode), the travel in the second control mode, in which the starting condition of the engine is less likely to be established, is prohibited. Accordingly, the power of the engine is easily acquired, and a consumed amount of the electric power of the motor is thereby suppressed. Thus, the discharged amount of the electric power by the electric power storage device is suppressed. As a result, the state of charge of the electric power storage device can further easily be brought closer to the initial value thereof by the recovery processing.

The hybrid vehicle may be configured to be able to execute learning control for learning driving behavior of a driver. In the hybrid vehicle, the electronic control unit may be configured to prohibit execution of the learning control when the use mode is the second use mode.

With this configuration, the learning control, which depends on the driving behavior of the person before a change, can be suppressed from passing to the person after the change or the owner.

A second aspect of the present disclosure is a control method for a hybrid vehicle. The hybrid vehicle includes an engine, a first motor generator, an electric power storage device, and an electronic control unit. The first motor generator is configured to generate electric power by using power of the engine. The electric power storage device is electrically connected to the first motor generator. The electronic control unit is configured to control the engine and the first motor generator. The control method includes: switching, by the electronic control unit, a use mode to either one of a first use mode and a second use mode; and executing, by the electronic control unit, recovery processing when the use mode is the second use mode. The first use mode is a mode in which an owner of the hybrid vehicle is a user of the hybrid vehicle. The second use mode is a mode in which any of persons other than the owner of the hybrid vehicle is the user. The recovery processing is processing of controlling the engine and the first motor generator such that a state of charge of the electric power storage device when the user finishes using the hybrid vehicle is brought closer to an initial value of the state of charge when the user starts using the hybrid vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A detailed description will hereinafter be made on embodiments of the present disclosure with reference to the drawings. Note that the same or corresponding portions in the drawings are denoted by the same reference numerals and the description thereon will not be repeated.

First Embodiment

Figure 1:
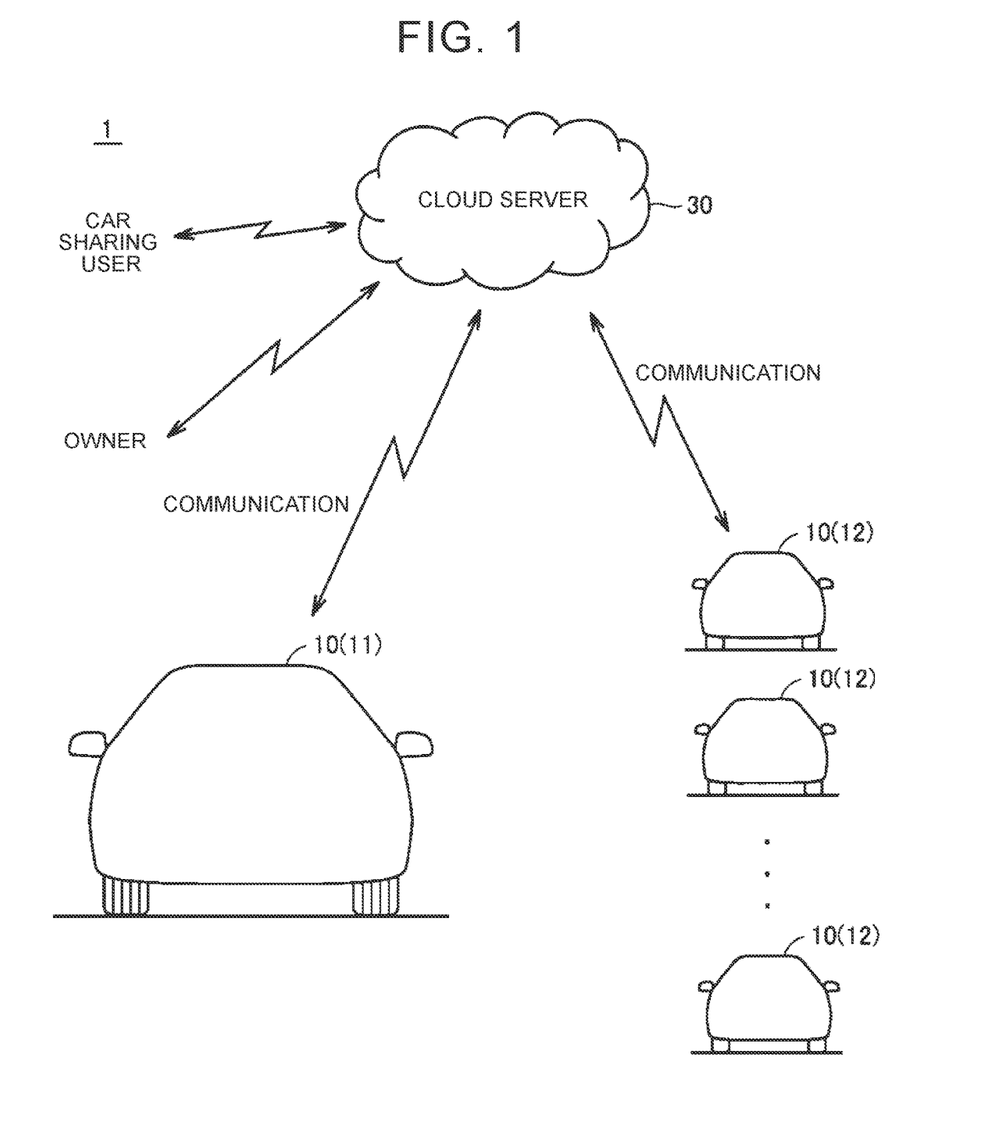
FIG. 1 is a schematic view of one example of an overall configuration of a vehicle control system.

FIG. 1 is a schematic view of one example of an overall configuration of a vehicle control system 1 according to a first embodiment. The vehicle control system 1 includes a plurality of vehicles 10 and a cloud server 30.

Each of the vehicles 10 is a so-called connected vehicle that is configured to be wirelessly communicable with the cloud server 30. Each of the vehicles 10 sends a plurality of types of information related to vehicle travel (hereinafter also simply referred to as "vehicle travel data") to the cloud server 30 at specified intervals (for example, per several seconds), and the plurality of types of the information include a current position, a travel load (travel power), and the like.

The cloud server 30 stratifies and accumulates information (the above-described vehicle travel data and the like), which is received from each of the vehicles 10, for each of the vehicles 10. In response to a request from each of the vehicles 10, the cloud server 30 is configured to send the data, which is requested from the vehicle 10, to the vehicle 10.

Hereinafter, of the vehicles 10, the vehicle that executes control according to the present disclosure will also be described as a "host vehicle 11", and the vehicles 10 other than the host vehicle 11 will also be described as "other vehicles 12". In this embodiment, the host vehicle 11 is a hybrid vehicle that includes a motor and an engine as drive power sources. Note that vehicle types of the vehicles 10 other than the host vehicle 11 are not particularly limited.

The host vehicle 11 is configured to be able to switch a use mode between an "owner mode" in which an owner of the host vehicle 11 is a user and a "car sharing mode" in which any of persons other than the owner (hereinafter also referred to as "sharing users") is the user. Here, the owner mode is one example of the first use mode. The car sharing mode is one example of the second use mode.

The car sharing mode is a use mode that is applied when a car sharing system is used. The car sharing system is a system providing such service that the owner rents the vehicle to one of the sharing users who are registered in advance and the sharing user drives the owner's vehicle. A representative example of the car sharing system is UBER® that is a car dispatch service operated by Uber Technologies Inc., a corporation in the United States of America.

The cloud server 30 manages the car sharing system used by the host vehicle 11. More specifically, the cloud server 30 communicates with the host vehicle 11, an owner's portable terminal (a smartphone or the like), and a sharing user's portable terminal, and thereby manages the use mode (whether the owner mode or the car sharing mode) of the host vehicle 11, registration of a sharing user's name during the car sharing mode, a reservation status and a use status of the host vehicle 11 by the sharing user, and the like. When necessary, the cloud server 30 notifies the owner and the sharing user of a management status.

Figure 2:
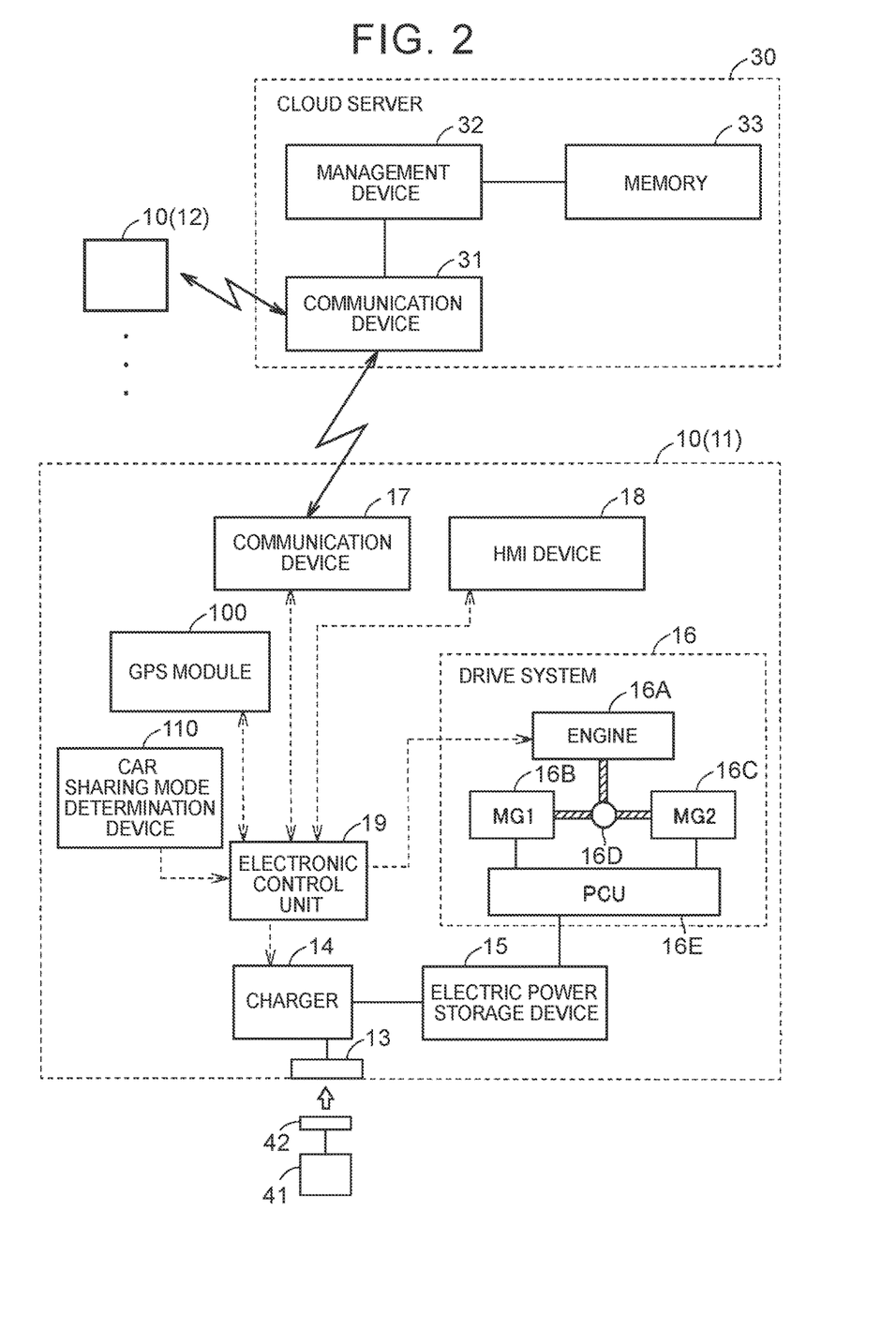
FIG. 2 is a detailed view of one example of configurations of a vehicle and a cloud server.

FIG. 2 is a detailed view of one example of configurations of the vehicle 10 and the cloud server 30. In the example shown in FIG. 2, the host vehicle 11 is a so-called plug-in hybrid vehicle. More specifically, the host vehicle 11 (the vehicle 10) includes an inlet 13, a charger 14, an electric power storage device 15, a drive system 16, a communication device 17, a human machine interface (HMI) device 18, an electronic control unit 19, a global positioning system (GPS) module 100, and a car sharing mode determination device 110. The cloud server 30 includes a communication device 31, a management device 32, and memory 33.

The inlet 13 is configured to be connectable with a connector 42 of a power feeding facility 41 on the outside of the vehicle. The charger 14 is provided between the inlet 13 and the electric power storage device 15, converts external electric power received from the power feeding facility 41 to electric power storable in the electric power storage device 15, and outputs the converted electric power to the electric power storage device 15. Hereinafter, charging of the electric power storage device 15 using the external electric power will also be referred to as "external charging".

The electric power storage device 15 is a secondary battery, such as a nickel-metal hydrogen battery or a lithium-ion battery, that is configured to be rechargeable. Note that the electric power storage device 15 may be a capacitor of large capacitance.

The drive system 16 generates drive power of the vehicle 10. The drive system 16 includes an engine 16A, a first motor generator (MG) 16B, a second MG 16C, a power split device 16D, and a power control unit (PCU) 16E.

The engine 16A is an internal combustion engine such as a gasoline engine or a diesel engine. The engine 16A is controlled by a control signal from the electronic control unit 19. The power generated by the engine 16A is split into power transmitted to drive wheels via a path and power transmitted to the first MG 16B via a path by the power split device 16D.

Each of the first MG 16B and the second MG 16C is a three-phase AC rotary electric machine that is driven by the PCU 16E. The first MG 16B generates the electric power by using the power of the engine 16A, which is split by the power split device 16D. The second MG 16C generates the drive power of the host vehicle 11 (the vehicle 10) by using at least one of the electric power stored in the electric power storage device 15 and the electric power generated by the first MG 16B. In addition, the second MG 16C generates regenerative electric power by using kinetic energy of the vehicle 10, which is transmitted from the drive wheels, during inertia travel in an accelerator-off state (a state where the user does not depress an accelerator pedal). The regenerative electric power generated by the second MG 16C is collected in the electric power storage device 15.

The power split device 16D includes a planetary gear mechanism that mechanically couples the engine 16A, the first MG 16B, and the second MG 16C (see FIG. 6 described below).

The PCU 16E converts DC power stored in the electric power storage device 15 to AC power with which the first MG 16B and the second MG 16C can be driven. In addition, the PCU 16E converts the AC power generated by the first MG 16B and the second MG 16C to the DC power storable in the electric power storage device 15.

The communication device 17 is configured to be wirelessly communicable with the communication device 31 of the cloud server 30. The communication device 17 is connected to the electronic control unit 19 by a communication line, sends the information (the above-described vehicle travel data and the like) transmitted from the electronic control unit 19 to the cloud server 30, and transmits the information received from the cloud server 30 to the electronic control unit 19.

The HMI device 18 is a device that provides the user with various types of information related to the vehicle 10 and that receives a user's operation. The HMI device 18 includes a display, a speaker, and the like provided in a cabin.

The GPS module 100 is a receiver used in a satellite positioning system. The GPS module 100 computes the current position of the vehicle 10 on the basis of a received signal and outputs a computation result to the electronic control unit 19. Note that the GPS module 100 may be incorporated in a navigation system that includes a map database.

The car sharing mode determination device 110 determines whether the use mode of the host vehicle 11 is the owner mode or the car sharing mode, and outputs a determination result to the electronic control unit 19. The car sharing mode determination device 110 can be configured by including, for example: a switch that is operated by the user when the car sharing mode is selected; an authentication device that authenticates whether a driver is the owner; a dedicated application that can acquire use mode information of the host vehicle 11 from the car sharing system managed by the cloud server 30; and the like.

Furthermore, although not shown, the vehicle 10 includes a plurality of sensors that detect various physical quantities required for control of the vehicle 10, and the plurality of sensors include: a vehicle speed sensor that detects a vehicle speed; a monitoring sensor that detects states (a voltage, a current, a temperature, and the like) of the electric power storage device 15; an acceleration sensor that detects acceleration of the vehicle 10; and the like. Each of these sensors outputs a detection result to the electronic control unit 19.

The electronic control unit 19 includes a CPU and memory, which are not shown, therein and controls various types of equipment of the vehicle 10 (the charger 14, the drive system 16, the communication device 17, the HMI device 18, and the like) on the basis of the information stored in the memory and the information from each of the sensors.

The cloud server 30 is configured to be able to aggregate the information from each of the vehicles 10. More specifically, as described above, the cloud server 30 includes the communication device 31, the management device 32, and the memory 33.

The communication device 31 is configured to be wirelessly communicable with the communication device 17 of the vehicle 10. The communication device 31 is connected to the management device 32 by a communication line, sends information transmitted from the management device 32 to the vehicle 10, and transmits the information (the above-described vehicle travel data and the like) received from the vehicle 10 to the management device 32.

The management device 32 includes a CPU, which is not shown, therein and stores the information received from each of the vehicles 10 in the memory 33. The management device 32 also performs various calculations using the information stored in the memory 33. For example, as described above, the management device 32 manages the car sharing system used by the host vehicle 11.

Normal SOC Control During Owner Mode

Figure 3:
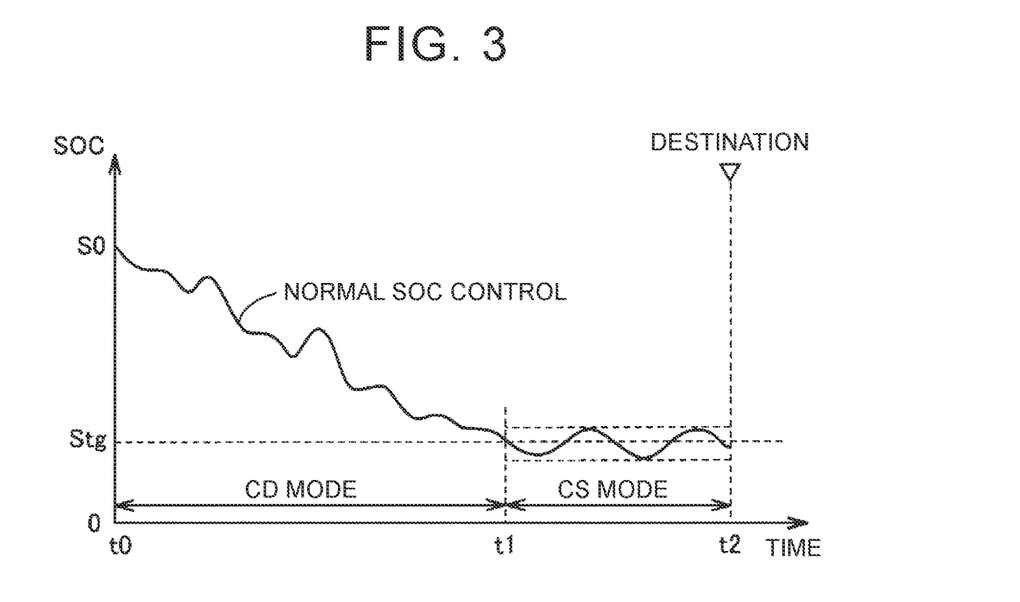
FIG. 3 is a graph of one example of changes of a SOC and a control mode during an owner mode.

FIG. 3 is a graph of one example of changes of a state of charge (SOC) of the electric power storage device 15 and of a control mode of the host vehicle 11 during the owner mode.

During the owner mode, the electronic control unit 19 of the host vehicle 11 selects either a charge depleting (CD) mode or a charge sustaining (CS) mode, and controls the drive system 16 (the engine 16A, the PCU 16E, and the like) in accordance with the selected mode. The CD mode is a control mode in which the SOC of the electric power storage device 15 is depleted. The CS mode is a control mode in which the SOC is maintained within a specified range.

At use initiation time t0 onward, the electronic control unit 19 selects the CD mode until time t1 at which the SOC of the electric power storage device 15 is decreased to a specified value Stg. Then, at the time t1, at which the SOC is decreased to the specified value Stg, onward, the electronic control unit 19 selects the CS mode until time t2 at which the host vehicle 11 arrives at a destination. Hereinafter, this control will also be referred to as "normal SOC control".

During the CD mode, the engine 16A is not actuated for a purpose of maintaining the SOC. Accordingly, although there is a case where the SOC is temporarily increased due to the regenerative electric power of the second MG 16C and the like during deceleration, the SOC as a whole is gradually decreased from an initial value S0 at the use initiation time.

Meanwhile, in the CS mode, the SOC is maintained within the specified range. In the example shown in FIG. 3, at the time t1, at which the SOC is decreased to the specified value Stg, the CD mode is switched to the CS mode. Thereafter, the SOC is maintained within the specified range that includes the specified value Stg. The electronic control unit 19 appropriately allows the first MG 16B to generate the electric power by using the power of the engine 16A, and thereby maintains the SOC within the specified range. In the CS mode, the engine 16A is actuated, so as to maintain the SOC within the specified range. Here, an upper limit value and a lower limit value of the specified range are fixed values and are not values for which the SOC at the use initiation time t0 is taken into consideration.

Accordingly, during the owner mode, as shown in FIG. 3, the SOC at the destination arrival time t2 (use termination time) has a lower value than the SOC at the use initiation time t0. In the preparation of next travel, the owner himself/herself performs the external charging to recover the SOC.

SOC Control During Car Sharing Mode

During the car sharing mode, the user is possibly changed among the sharing users other than the owner. Accordingly, during the car sharing mode, in the case where the SOC at the use termination time is lower than the SOC (the initial value) at the use initiation time when the first user uses the host vehicle 11, for example, a usable amount of the electric power by the next sharing user becomes smaller than that by the first sharing user. As a result, it is concerned that the electric power cannot be used evenly by the first sharing user and the next sharing user.

In view of the above point, when the use mode is the car sharing mode, the electronic control unit 19 according to this embodiment controls the engine 16A, the first MG 16B, and the second MG 16C such that the SOC of the electric power storage device 15 at the time when the sharing user finishes using the host vehicle 11 is brought closer to the initial value S0 at the time when the sharing user starts using the host vehicle 11. In this way, the SOC at the time when the sharing user after the change starts using the host vehicle 11 is in a level of the SOC at the time when the sharing user before the change starts using the host vehicle 11. Thus, the amounts of the electric power that can respectively be consumed by the sharing users can be brought closer to the same level.

Hereinafter, a description will primarily be made on a control example in which the change of the sharing user is assumed at the destination of the host vehicle 11. When a point of location at which the sharing user is changed can be recognized in advance, the point of location can be set as the destination.

Figure 4:
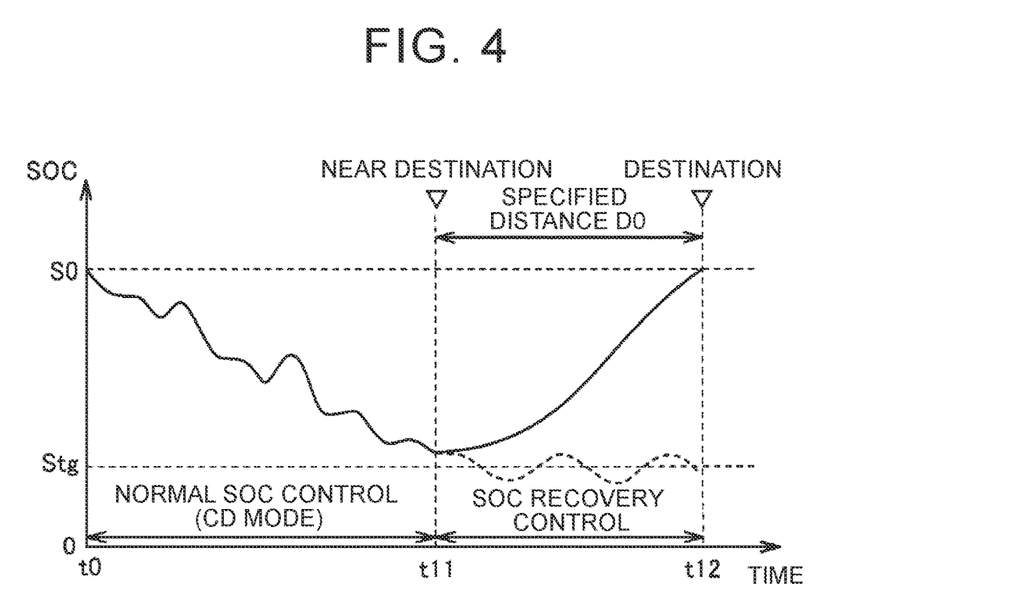
FIG. 4 is a graph of one example of the changes of the SOC and the control mode during a car sharing mode.

FIG. 4 is a graph of one example of the changes of the SOC of the electric power storage device 15 and of the control mode of the host vehicle 11 during the car sharing mode.

During the car sharing mode, the electronic control unit 19 stores the SOC at time t0 at which the sharing user starts using the host vehicle 11 as the "initial value S0".

Then, until time t11 at which the host vehicle 11 reaches a range within a specified distance D0 from the destination, the electronic control unit 19 executes the above-described normal SOC control. That is, the CD mode is selected until the SOC is decreased to the specified value Stg. Then, at time at which the SOC is decreased to the specified value Stg onward, the CS mode is selected. Note that, in the example shown in FIG. 4, because the SOC is not decreased to the specified value Stg in a period before the time t11, the CD mode is selected in the normal SOC control.

Then, at the time at which the host vehicle 11 reaches the range within the specified distance D0 from the destination onward, the electronic control unit 19 executes "SOC recovery control" in which the SOC of the electric power storage device 15 is brought closer to the initial value S0 by increasing the amount of the electric power generated by the first MG 16B using the power of the engine 16A. That is, in the SOC recovery control, the engine 16A is actuated, so as to recover the SOC to the initial value S0. In this way, at time t12 at which the host vehicle 11 reaches the destination, in the preparation of the use by the next sharing user, the SOC can be recovered to the level of the initial value S0. As a result, the first sharing user and the next sharing user can equally make travel by using the electric power of the electric power storage device 15. Here, the SOC recovery control is one example of the recovery processing.

Switching Flowchart of SOC Control

Figure 5:
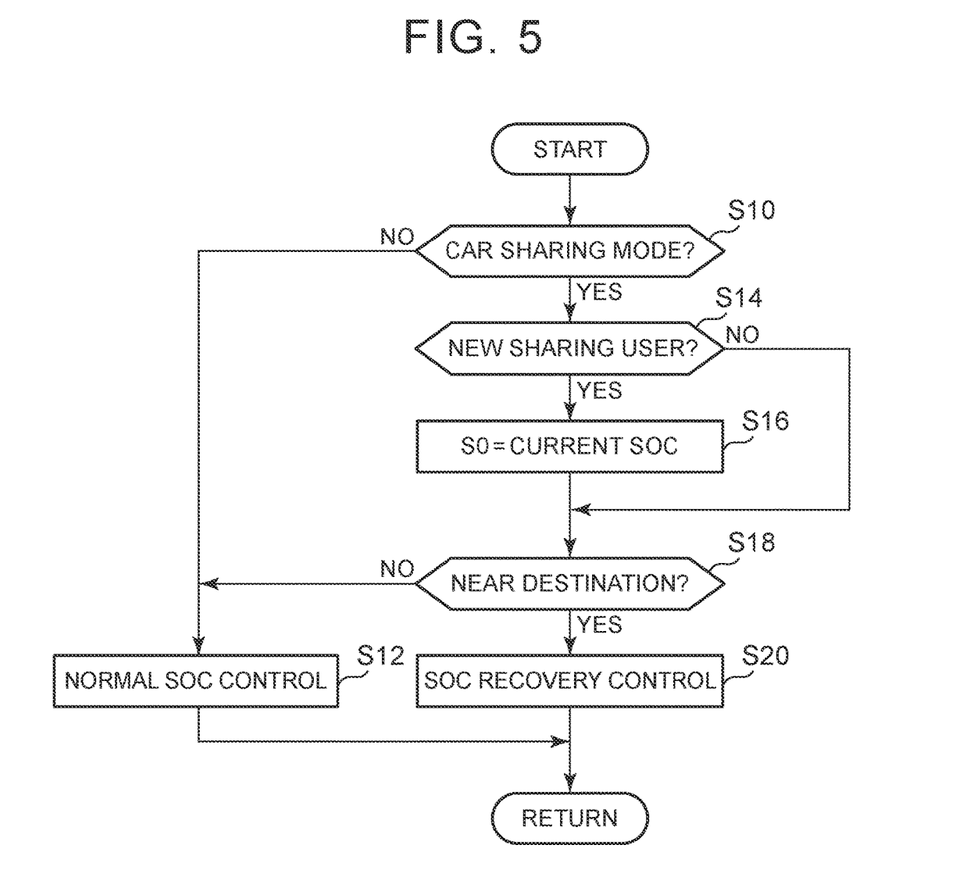
FIG. 5 is a flowchart of one example of a processing procedure by an electronic control unit.

FIG. 5 is a flowchart of one example of a processing procedure that is executed by the electronic control unit 19 of the host vehicle 11. This flowchart is repeatedly executed in specified cycles.

The electronic control unit 19 determines whether the use mode is the car sharing mode (step S10). When the use mode is not the car sharing mode (NO in step S10), that is, when the use mode is the owner mode, the electronic control unit 19 executes the above-described normal SOC control (step S12).

When the use mode is the car sharing mode (YES in step S10), the electronic control unit 19 executes setting processing of the initial value S0 in steps S14, S16.

More specifically, the electronic control unit 19 first determines whether the user in the current cycle is the new sharing user who is different from the sharing user(s) in the previous cycle(s) (step S14). For example, the electronic control unit 19 checks with the cloud server 30 about the sharing user(s) of the host vehicle 11. Then, when the current sharing user is different from the sharing user(s) in the previous cycle(s), the electronic control unit 19 determines that the current sharing user is the new sharing user. Alternatively, for example, the car sharing mode determination device 110 has a function of authenticating the driver. In such a case, when the driver who is authenticated by the car sharing mode determination device 110 in the current cycle is different from the driver(s) who is (are) authenticated by the car sharing mode determination device 110 in the previous cycle(s), the electronic control unit 19 may determine that the current sharing user is the new sharing user.

When the user in the current cycle is the new sharing user (YES in step S14), the electronic control unit 19 stores the current SOC as the initial value S0 (step S16). Thereafter, the processing proceeds to step S18. When the user in the current cycle is the same sharing user as that in the last cycle (NO in step S14), the electronic control unit 19 skips the processing in step S16. Then, the processing proceeds to step S18.

The electronic control unit 19 determines whether the host vehicle 11 has reached a location near the destination (the range within the specified distance D0 from the destination) (step S18).

When the host vehicle 11 has not reached the location near the destination (NO in step S18), the electronic control unit 19 executes the normal SOC control (step S12). When the host vehicle 11 has reached the location near the destination (YES in step S18), the electronic control unit 19 executes the above-described SOC recovery control (step S20). In this way, at the time point at which the host vehicle 11 reaches the destination, the SOC is recovered to the level of the initial value S0.

As it has been described so far, when the use mode is the car sharing mode, the electronic control unit 19 according to this embodiment is controlled such that the SOC of the electric power storage device 15 at the time when the user finishes using the host vehicle 11 (at the time when the host vehicle 11 reaches the destination) is brought closer to the initial value S0 at the time when the user starts using the host vehicle 11. Thus, the amounts of the electric power that can respectively be consumed by the sharing users can be brought closer to the same level. As a result, during the car sharing mode, the electric power of the electric power storage device 15 can be consumed evenly by the sharing users.

Second Embodiment

The electronic control unit 19 according to the above-described first embodiment executes the processing of executing the SOC recovery control during the car sharing mode.

Meanwhile, in addition to the above processing, the electronic control unit 19 according to this second embodiment executes processing of prohibiting travel using both of the motors during the car sharing mode. Because the other structures, functions, and processing are the same as those in the above-described first embodiment, the detailed description thereon will not be made herein.

The travel using both of the motors is a travel aspect in which the host vehicle 11 travels by using the power of both of the first MG 16B and the second MG 16C in a state where the engine 16A is stopped. Hereinafter, a description will sequentially be made on a detailed configuration of the drive system 16 of the host vehicle 11, the travel using both of the motors, and the processing of prohibiting the travel using both of the motors.

Detailed Configuration of Drive System

Figure 6:
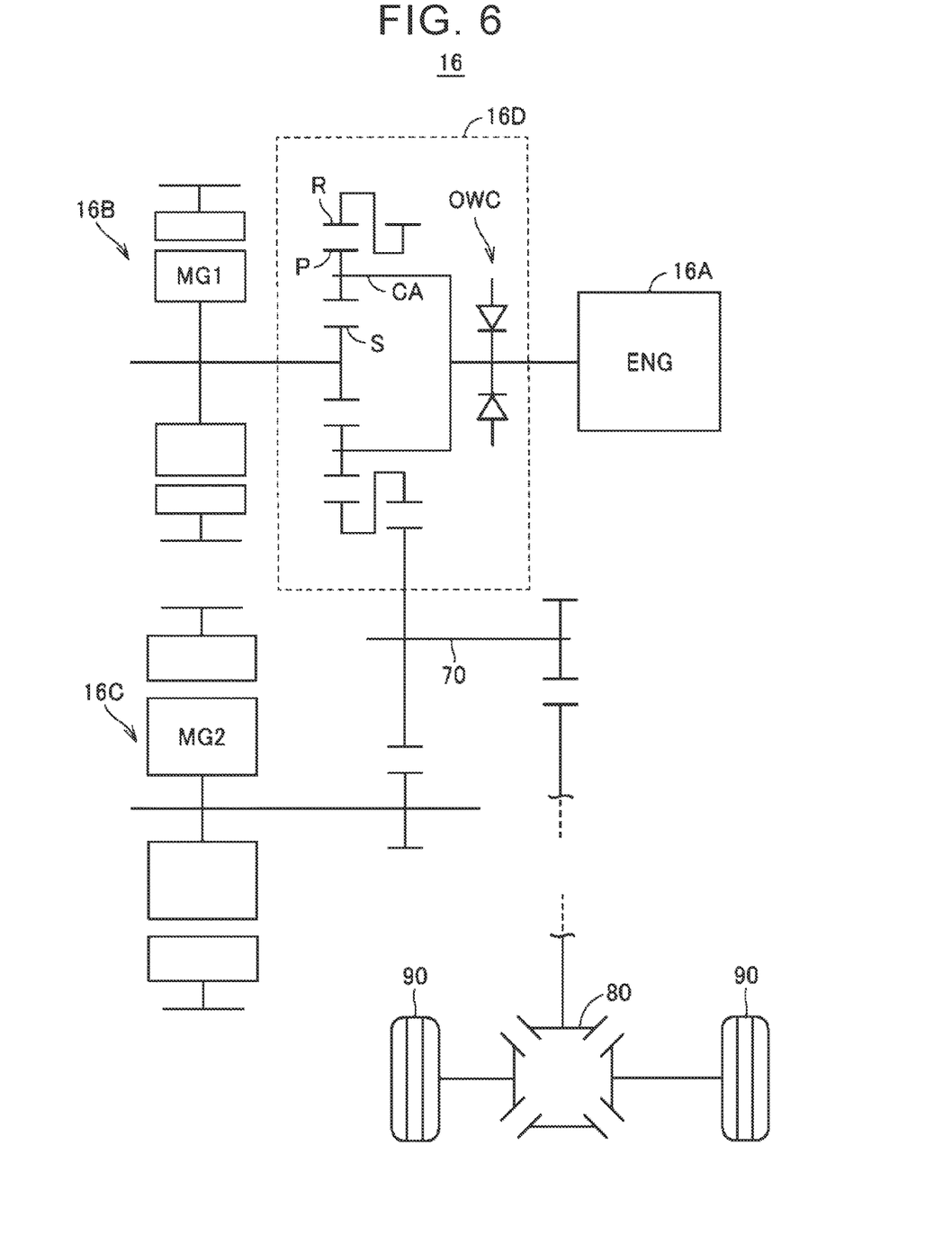
FIG. 6 is a view of one example of a detailed configuration of a drive system.

FIG. 6 is a view of one example of the detailed configuration of the drive system 16 in the host vehicle 11. In addition to the engine 16A, the first MG 16B, the second MG 16C, and the power split device 16D described above, the drive system 16 includes a countershaft (an output shaft) 70, a differential gear 80, and drive wheels 90.

In the example shown in FIG. 6, a rotational shaft of the first MG 16B is coaxially arranged with a crankshaft of the engine 16A. A rotational shaft of the second MG 16C is arranged in parallel with the rotational shaft of the first MG 16B. The countershaft 70 is arranged in parallel with the rotational shaft of the first MG 16B and the rotational shaft of the second MG 16C.

The power split device 16D includes: a planetary gear mechanism of a single pinion type that includes a sun gear S, a pinion gear P, a carrier CA, and a ring gear R; and a one-way clutch OWC. The carrier CA is coupled to the crankshaft of the engine 16A. The sun gear S is coupled to the rotational shaft of the first MG 16B. The pinion gear P is arranged between the sun gear S and the ring gear R and meshes with each of the sun gear S and the ring gear R. The carrier CA supports the pinion gear P in a manner to allow rotation and revolution thereof.

As will be described below, a rotational speed of the sun gear S (that is, a rotational speed of the first MG 16B), a rotational speed of the carrier CA (that is, a speed of the engine 16A), and a rotational speed of the ring gear R establish a relationship of being connected by a straight line in a collinear diagram (that is, a relationship in which, when any two of the rotational speeds are determined, the remaining rotational speed is determined).

The one-way clutch OWC is coupled to the crankshaft of the engine 16A, permits rotation of the crankshaft in a positive direction, and suppresses the rotation thereof in a negative direction.

The power of the engine 16A and the first MG 16B is transmitted to the countershaft 70 via the power split device 16D. The power of the second MG 16C is also transmitted to the countershaft 70. The countershaft 70 is coupled to the right and left drive wheels 90 via the differential gear 80.

Travel Using Both Motors

The host vehicle 11 can travel in a travel aspect of either motor travel (EV travel) or hybrid travel (HV travel). In the HV travel, the travel power is generated by the power of the engine 16A and the second MG 16C. In the EV travel, the engine 16A is stopped, and the travel power is generated by the second MG 16C only or both of the first MG 16B and the second MG 16C (hereinafter simply referred to as the "motors").

The EV travel is further segmented into single motor travel and the travel using both of the motors. In the single motor travel, the host vehicle 11 travels using the power of the second MG 16C only. In the travel using both of the motors, the host vehicle 11 travels using the power of both of the first MG 16B and the second MG 16C.

Figure 7:
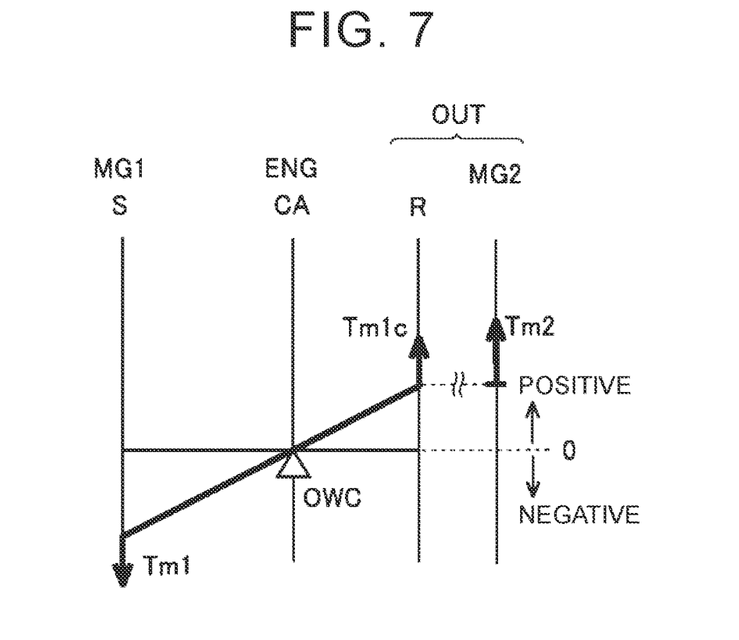
FIG. 7 is a view in which one example of a control state during travel using both motors is shown in a collinear diagram.

FIG. 7 is a view in which one example of a control state of the engine 16A, the first MG 16B, and the second MG 16C during the travel using both of the motors is shown in a collinear diagram of the power split device 16D. "S", "CA", "R", and "OWC" shown in FIG. 7 respectively indicate the sun gear S, the carrier CA, the ring gear R, and the one-way clutch OWC of the power split device 16D.

In the travel using both of the motors, the engine 16A is stopped, and rotation of the engine 16A in the negative direction is restricted by the one-way clutch OWC. In this state, the electronic control unit 19 operates the first MG 16B and the second MG 16C as the motors.

More specifically, the electronic control unit 19 makes torque of the second MG 16C (hereinafter also referred to as "second MG torque Tm2") act in the positive direction and makes torque of the first MG 16B (hereinafter also referred to as "first MG torque Tm1") act in the negative direction. The second MG torque Tm2 is transmitted to the countershaft 70 and acts as drive torque of the host vehicle 11. The first MG torque Tm1 is transmitted to the ring gear R with the carrier CA being a fulcrum. The first MG torque Tm1 that is transmitted to the ring gear R (hereinafter referred to as "first MG transmitted torque Tm1c") acts in the positive direction and is transmitted to the countershaft 70. Thus, in the travel using both of the motors, the host vehicle 11 travels by using the first MG transmitted torque Tm1c and the second MG torque Tm2.

Prohibition of Travel Using Both Motors During Car Sharing Mode

In the travel using both of the motors, because the host vehicle 11 travels by using the power of both of the first MG 16B and the second MG 16C, a consumed amount of the electric power during the travel using both of the motors is large, and a discharged amount of the electric power by the electric power storage device 15 is increased. Accordingly, when the travel using both of the motors is made during the car sharing mode, a reduced amount of the SOC is increased. As a result, it is concerned that the SOC is not appropriately recovered by the SOC recovery processing. In addition, it is concerned that driving by the sharing user other than the owner leads to excess charging/discharging of the electric power storage device 15, which results in early deterioration of the electric power storage device 15.

In view of the above points, the electronic control unit 19 according to this second embodiment executes the processing of prohibiting the travel using both of the motors during the car sharing mode.

Figure 8:
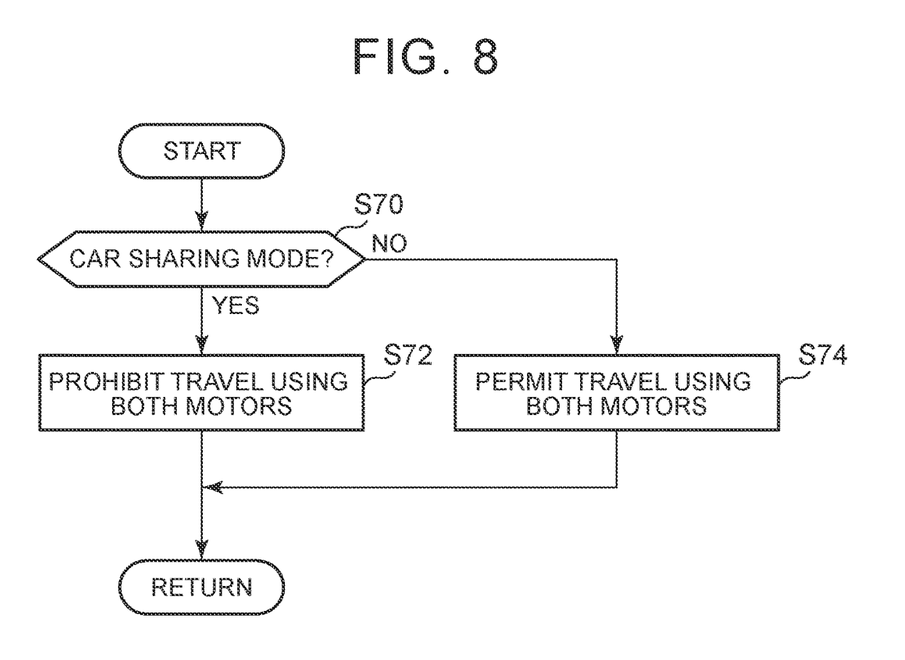
FIG. 8 is a flowchart of one example of the processing procedure by the electronic control unit.

FIG. 8 is a flowchart of one example of a processing procedure that is executed by the electronic control unit 19 of the host vehicle 11 according to this second embodiment.

The electronic control unit 19 determines whether the use mode is the car sharing mode (step S70). When the use mode is the car sharing mode (YES in step S70), the electronic control unit 19 prohibits the travel using both of the motors (step S72). When the use mode is not the car sharing mode (NO in step S70), that is, the use mode is the owner mode, the electronic control unit 19 permits the travel using both of the motors (step S74).

As it has been described so far, when the use mode is the car sharing mode, the electronic control unit 19 according to this second embodiment prohibits the travel using both of the motors, in which the consumed amount of the electric power is large. In this way, the discharged amount of the electric power by the electric power storage device 15 during the car sharing mode is suppressed, and a decrease in the SOC is suppressed. As a result, the SOC can further easily be brought closer to the initial value S0 by the SOC recovery processing. Furthermore, because the excess charging/discharging of the electric power storage device 15 is suppressed, the early deterioration of the electric power storage device 15, which is resulted from driving by the sharing user other than the owner, can be suppressed.

Third Embodiment

The electronic control unit 19 according to the above-described first embodiment executes the processing of executing the SOC recovery control during the car sharing mode.

Meanwhile, in addition to the above processing, the electronic control unit 19 according to this third embodiment prohibits selection of a control mode (a second control mode), in which a starting condition of the engine 16A is less likely to be established, during the car sharing mode. Because the other structures, functions, and processing are the same as those in the above-described first embodiment, the detailed description thereon will not be made herein.

Hereinafter, a description will sequentially be made on the control modes of the host vehicle 11 and selection prohibition processing of the control mode.

Control Modes of Host Vehicle

As described above, the CD mode and the CS mode exist as the control modes of the host vehicle 11. Furthermore, in the host vehicle 11 according to this embodiment, as the CD mode, three types of the CD modes are prepared, and the three types of the CD modes are an EV-AUTO mode, an EV-CITY mode, and an EV-priority mode. During the CD mode, the electronic control unit 19 selects any one of the above three types of the CD modes.

Note that the selectable types of the CD modes are not necessarily limited to the three types. For example, the selectable types of the CD modes may be two types that are the EV-AUTO mode and the EV-priority mode or may be two types that are the EV-AUTO mode and the EV-CITY mode.

Figure 9:
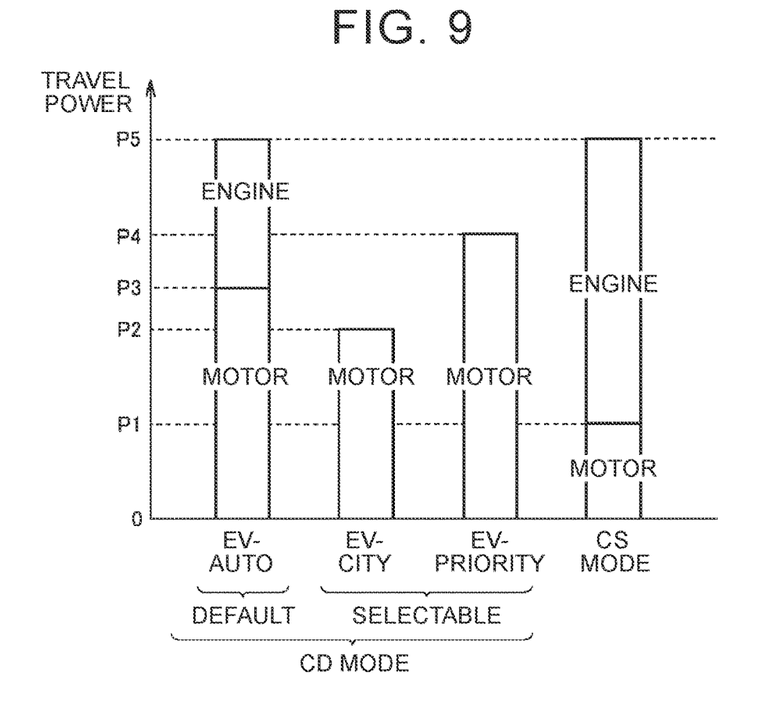
FIG. 9 is a graph that schematically shows travel power in each of the modes and a generation source(s) thereof.

FIG. 9 is a graph that schematically shows one example of the travel power and a generation source(s) thereof in each of the modes. In the CS mode, when requested power is lower than an engine starting threshold P1, the travel power is generated by the motor. When the requested power is equal to or higher than the engine starting threshold P1, the travel power is generated by the motor and the engine 16A. Upper limit travel power in the CS mode is set to a specified value P5.

Also, in the EV-AUTO mode, similar to the CS mode, actuation of the engine 16A is permitted. Here, an engine starting threshold P3 in the EV-AUTO mode is set to a higher value than the engine starting threshold P1 in the CS mode. In this way, in comparison with the CS mode, a travel region by the motor is expanded in the EV-AUTO mode. More specifically, when the requested power is lower than the engine starting threshold P3 (P3>P1), the travel power is generated by the motor. When the requested power is equal to or higher than the engine starting threshold P3, the travel power is generated by the motor and the engine 16A. Here, similar to the CS mode, the upper travel power in the EV-AUTO mode is set to the specified value P5.

In the EV-priority mode, the actuation of the engine 16A is not permitted for a purpose of acquiring the travel power, and the upper limit travel power is set to a specified value P4 that is higher than the engine starting threshold P3 in the EV-AUTO mode. Thus, in the EV-priority mode, the travel power is generated by the motor within a range below the specified value P4. Even when the requested power becomes equal to or higher than the specified value P4, the engine 16A is not actuated.

In the EV-CITY mode, the actuation of the engine 16A is not permitted for the purpose of acquiring the travel power, and the upper limit travel power is set to a specified value P2 that is lower than the engine starting threshold P3 in the EV-AUTO mode. Thus, in the EV-CITY mode, the travel power is generated by the motor within a range below the specified value P2. Even when the requested power becomes equal to or higher than the specified value P2, the engine 16A is not actuated.

Note that, in this embodiment, the EV-AUTO mode is set as a default mode (an initial mode). The user can select the EV-priority mode or the EV-CITY mode by performing a mode changing operation.

Selection Prohibition Processing of Control Mode During Car Sharing Mode

As described above, in the EV-priority mode and the EV-CITY mode, the host vehicle 11 travels by the power of the motor, and the engine 16A is not actuated. Accordingly, the consumed amount of the electric power during the EV-priority mode or during the EV-CITY mode is large, and the discharged amount of the electric power by the electric power storage device 15 is increased. Thus, when the EV-priority mode or the EV-CITY mode is selected during the car sharing mode, the reduced amount of the SOC is increased. As a result, it is concerned that the SOC is not appropriately recovered by the SOC recovery processing. In addition, it is concerned that driving by the sharing user other than the owner leads to the excess charging/discharging of the electric power storage device 15, which results in the early deterioration of the electric power storage device 15.

In view of the above points, the electronic control unit 19 according to this third embodiment prohibits the selection of the EV-priority mode and the EV-CITY mode, in each of which the engine 16A is not actuated, during the car sharing mode.

Figure 10:
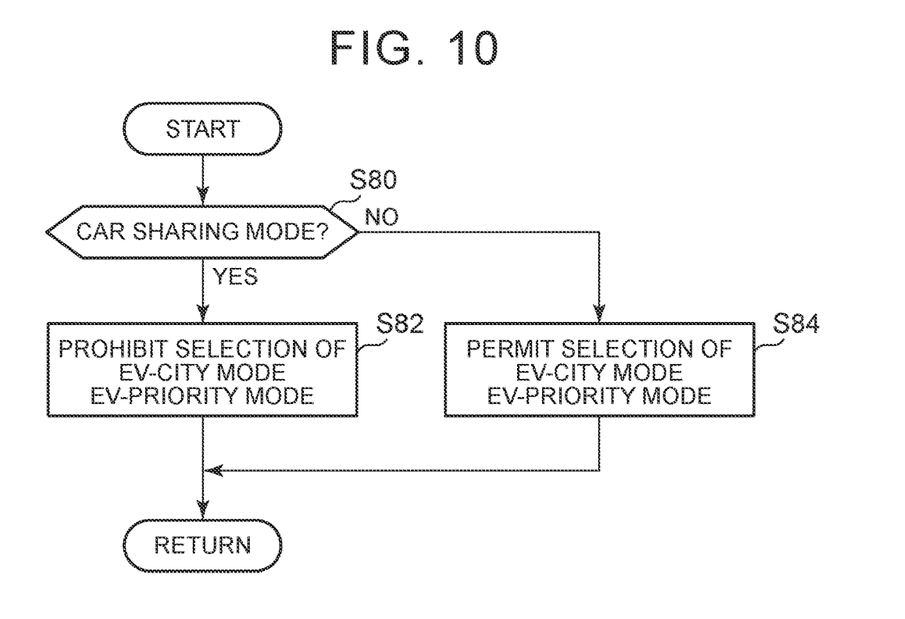
FIG. 10 is a flowchart of one example of the processing procedure by the electronic control unit.

FIG. 10 is a flowchart of one example of a processing procedure that is executed by the electronic control unit 19 of the host vehicle 11 according to this third embodiment.

The electronic control unit 19 determines whether the use mode is the car sharing mode (step S80). When the use mode is the car sharing mode (YES in step S80), the electronic control unit 19 prohibits the selection of the EV-priority mode and the EV-CITY mode, in each of which the actuation of the engine 16A is not permitted (step S82). In this way, when the CD mode is selected during the car sharing mode, the EV-AUTO mode, in which the actuation of the engine 16A is permitted, is selected.

On the other hand, when the use mode is not the car sharing mode (NO in step S80), that is, when the use mode is the owner mode, the electronic control unit 19 permits the selection of the EV-priority mode and the EV-CITY mode (step S84).

As it has been described so far, when the use mode is the car sharing mode, the electronic control unit 19 according to this third embodiment prohibits the selection of the EV-priority mode and the EV-CITY mode during the CD mode. Accordingly, when the CD mode is selected during the car sharing mode, the EV-AUTO mode is selected, and the actuation of the engine 16A is permitted. Thus, the discharged amount of the electric power by the electric power storage device 15 is suppressed, and the decrease in the SOC is suppressed. As a result, the SOC can further easily be brought closer to the initial value S0 by the SOC recovery processing. Furthermore, because the excess charging/discharging of the electric power storage device 15 is suppressed, the early deterioration of the electric power storage device 15, which is resulted from driving by the sharing user other than the owner, can be suppressed. Note that, in the case where the CD mode is selected in the car sharing mode, the EV-AUTO mode is one example of the first control mode, and the EV-priority mode and the EV-CITY mode are examples of the second control mode.

In this third embodiment, the description has been made on the example in which the control modes, the selection of which is prohibited during the car sharing mode, are the EV-priority mode and the EV-CITY mode, in each of which the engine 16A is not actuated.

However, the control mode, the selection of which is prohibited during the car sharing mode, is not limited to the control mode in which the engine 16A is not actuated, but may be the control mode in which the starting condition of the engine 16A is less likely to be established, for example.

For example, it can be said that, in the EV-AUTO mode, the actuation of the engine 16A is permitted; however, the starting condition of the engine 16A is less likely to be established than in the CS mode. Accordingly, during the car sharing mode, in addition to the EV-priority mode and the EV-CITY mode, the EV-AUTO mode may be prohibited, and only the CS mode may be permitted. Also, in such a case, the decrease in the SOC during the car sharing mode is suppressed. Thus, the SOC can further easily be brought closer to the initial value S0 by the SOC recovery processing, and the early deterioration of the electric power storage device 15, which is resulted from driving by the sharing user other than the owner, can be suppressed. In this case, the CS mode is one example of the first control mode. The CD mode, that is, the EV-priority mode, the EV-CITY mode, and the EV-AUTO are examples of the second control mode.

Fourth Embodiment

The electronic control unit 19 according to the above-described first embodiment executes the processing of executing the SOC recovery control during the car sharing mode.

Meanwhile, in addition to the above processing, the electronic control unit 19 according to this fourth embodiment executes processing of prohibiting learning control during the car sharing mode. Because the other structures, functions, and processing are the same as those in the above-described first embodiment, the detailed description thereon will not be made herein.

The electronic control unit 19 of the host vehicle 11 executes the "learning control" in which the electronic control unit 19 learns various parameters from history of driving behavior of the user (the driver), such as a travel route, the travel power, the vehicle speed, the acceleration, and an accelerator operation amount of the host vehicle 11, so as to control each of the types of the equipment by using learning results. As one example of the learning control, for example, the electronic control unit 19 executes "stop deceleration position learning control" in which, in cooperation with the navigation system, the electronic control unit 19 learns a position at which the host vehicle 11 is stopped or decelerated as a stop deceleration position, provides deceleration guidance or the like at a time point at which the host vehicle 11 reaches a position short of a specified distance D0 from the learned stop deceleration position, and thereby efficiently collects the regenerative electric power.

In the learning control as described above, learning is performed in dependence on the driving behavior of the user (the driver). Meanwhile, during the car sharing mode, the user (the driver) is possibly changed among the sharing users other than the owner. Accordingly, when the learning control is executed during the car sharing mode, the learning control that depends on the driving behavior of the user before the change is passed to the user after the change. Thus, it is concerned that the user after the change feels a sense of discomfort. In addition, a similar problem possibly occurs when the car sharing mode is returned to the owner mode and the owner drives the host vehicle 11.

In view of the above points, the electronic control unit 19 according to this fourth embodiment executes the processing of prohibiting the learning control during the car sharing mode.

Figure 11:
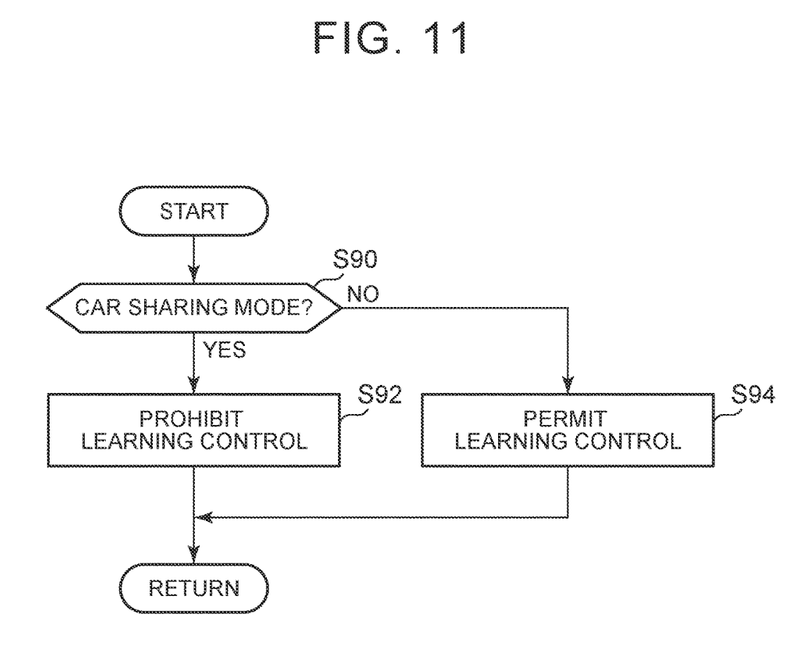
FIG. 11 is a flowchart of one example of the processing procedure by the electronic control unit.

FIG. 11 is a flowchart of one example of a processing procedure that is executed by the electronic control unit 19 of the host vehicle 11 according to this fourth embodiment.

The electronic control unit 19 determines whether the use mode is the car sharing mode (step S90). When the use mode is the car sharing mode (YES in step S90), the electronic control unit 19 prohibits execution of the learning control (step S92). When the use mode is not the car sharing mode (NO in step S90), that is, the use mode is the owner mode, the electronic control unit 19 permits the execution of the learning control (step S94).

As it has been described so far, the electronic control unit 19 according to this fourth embodiment prohibits the learning control during the car sharing mode. In this way, the learning control that depends on the driving behavior of the sharing user before the change is suppressed from being passed to the sharing user after the change or the owner.

As the learning control, in addition to the above-described stop deceleration position learning control, the followings are exemplified.

For example, the learning control may be "EV travel distance learning control" in which the electronic control unit 19 learns electric power consumption (an EV travel enabling distance per unit amount of the electric power) from history such as an EV travel distance and the reduced amount of the SOC of the host vehicle 11, computes the current EV travel enabling distance or the EV travel enabling distance during full charging by using the learned electric power consumption, and displays the EV travel enabling distance on the HMI device 18 or the like.

For example, the learning control may be "display learning control" in which, in addition to the above-described the electric power consumption, the electronic control unit 19 learns fuel economy (a travel enabling distance per unit amount of fuel) from history such as an HV travel distance and a consumed amount of the fuel of the host vehicle 11, and displays the learned electric power consumption, the learned fuel economy, and the like on the HMI device 18 or the like.

For example, the learning control may be "timer charging learning control" in which the electronic control unit 19 learns initiation timing of the external charging from history of an external charging schedule and automatically initiates the external charging at the learned initiation timing.

By prohibiting these types of the learning control during the car sharing mode, the learning control that depends on the driving behavior of the sharing user before the change is suppressed from being passed to the sharing user after the change or the owner.

It should be understood that the embodiments disclosed herein are illustrative in all respects and not restrictive. The scope of the present disclosure is defined by the claims rather than by the above description, and intends to include all modifications falling within the scope of the claims and equivalents thereof.

What is claimed is:

1. A hybrid vehicle comprising:
   an engine;
   a first motor generator configured to generate electric power by using power of the engine;
   an electric power storage device electrically connected to the first motor generator; and
   an electronic control unit configured to control the engine and the first motor generator,
   the electronic control unit being configured to switch a use mode to either one of a first use mode and a second use mode, the first use mode being a mode in which an owner of the hybrid vehicle is a user of the hybrid vehicle, and the second use mode being a mode in which any of persons other than the owner of the hybrid vehicle is the user, and
   the electronic control unit being configured to execute recovery processing when the use mode is the second use mode, the recovery processing being processing of controlling the engine and the first motor generator such that a state of charge of the electric power storage device when the user finishes using the hybrid vehicle is brought closer to an initial value of the state of charge when the user starts using the hybrid vehicle.

2. The hybrid vehicle according to claim 1, wherein
   the recovery processing is processing of bringing the state of charge of the electric power storage device closer to the initial value of the state of charge by increasing an amount of the electric power generated by the first motor generator using the power of the engine when the hybrid vehicle reaches a range within a specified distance from a destination of the hybrid vehicle.

3. The hybrid vehicle according to claim 1 further comprising
   a second motor generator connected to a drive wheel, wherein
   the electronic control unit is configured to, in addition to the recovery processing, prohibit travel using power of both of the first motor generator and the second motor generator when the use mode is the second use mode.

4. The hybrid vehicle according to claim 1, wherein
   the hybrid vehicle is configured to travel in any of control modes that include a first control mode and a second control mode,
   the second control mode is a control mode in which a starting condition of the engine is less likely to be established than in the first control mode, and
   the electronic control unit is configured to prohibit the travel of the hybrid vehicle in the second control mode when the use mode is the second use mode.

5. The hybrid vehicle according to claim 1, wherein
   the hybrid vehicle is configured to execute learning control for learning driving behavior of a driver, and
   the electronic control unit is configured to prohibit execution of the learning control when the use mode is the second use mode.

6. A control method for a hybrid vehicle,
   the hybrid vehicle including an engine, a first motor generator, an electric power storage device, and an electronic control unit,
   the first motor generator being configured to generate electric power by using power of the engine,
   the electric power storage device being electrically connected to the first motor generator, and
   the electronic control unit being configured to control the engine and the first motor generator,
   the control method comprising:
   switching, by the electronic control unit, a use mode to either one of a first use mode and a second use mode the first use mode being a mode in which an owner of the hybrid vehicle is a user of the hybrid vehicle, and the second use mode being a mode in which any of persons other than the owner of the hybrid vehicle is the user; and
   executing, by the electronic control unit, recovery processing when the use mode is the second use mode, the recovery processing being processing of controlling the engine and the first motor generator such that a state of charge of the electric power storage device when the user finishes using the hybrid vehicle is brought closer to an initial value of the state of charge when the user starts using the hybrid vehicle.

* * * * *